United States Patent Office 3,188,692
Patented June 15, 1965

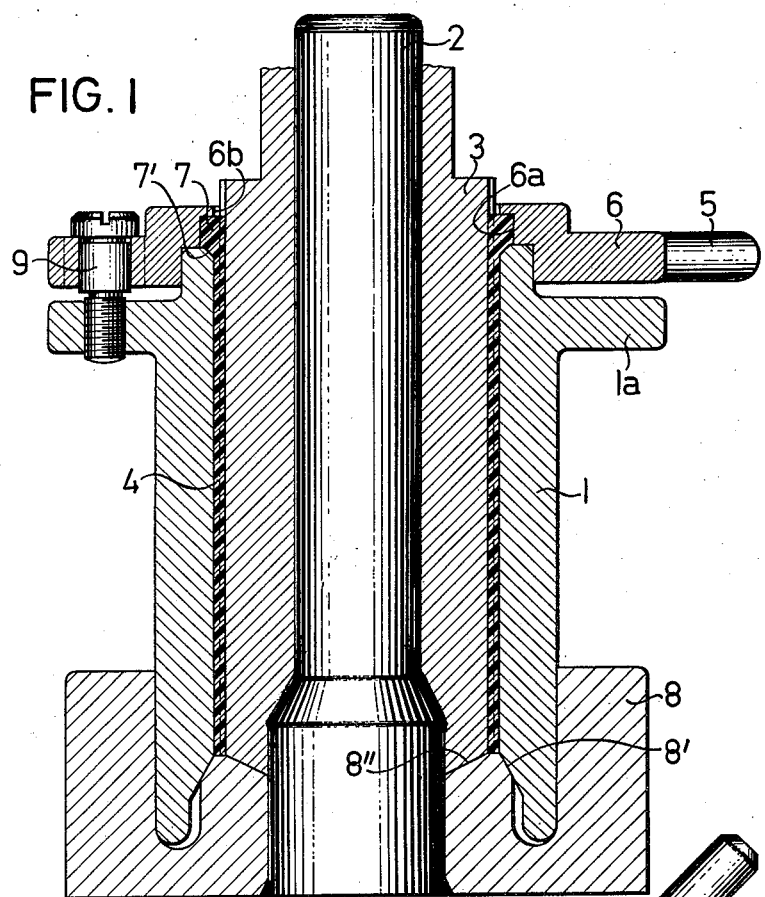
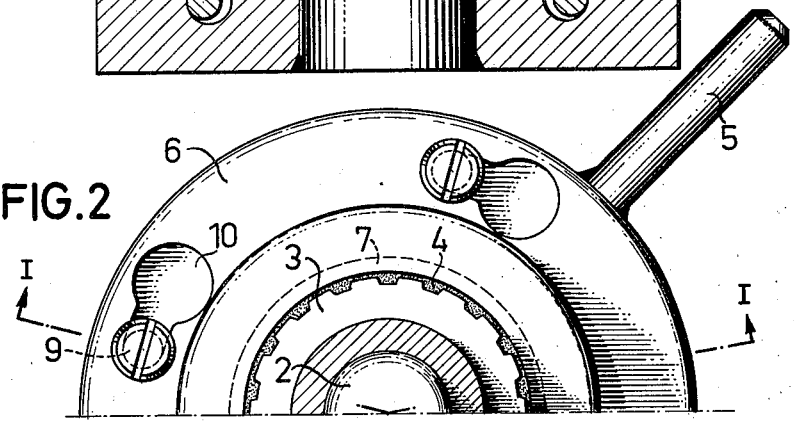

3,188,692
MOLD
Franz Felix Traeger, Hannover, Germany, assignor to Continental Gummi-Werke Aktiengesellschaft, Hannover, Germany
Filed Jan. 25, 1963, Ser. No. 253,950
3 Claims. (Cl. 18—42)

The present invention relates to a mold, especially a mold for casting hollow thin walled bodies of rubber-like material with the thin walls of such hollow bodies substantially parallel to the longitudinal axis thereof. The present invention is in particular directed to molds for use in connection with the casting of thin-walled hollow cylindrical bodies from which by cutting or the like endless thin-walled transmission belts are produced which may also be provided with teeth.

When making thin-walled hollow bodies of the above mentioned type, difficulties are encountered when the cast body is to be removed from the mold. Inasmuch as a hollow cylindrical body has necessarily to be molded in a mold chamber between an outer mold section and an inner mandrel or core-like mold section, a removal of the molded body can be effected only by separating the outer mold section from the inner mold section or vice versa. Customarily, the mold is so designed that when removing the inner mold section, the cast hollow cylindrical body remains on the inner mold section. This is particularly the case when the molded hollow cylinder is provided with reinforcing inserts as for instance pull-resistant strands, which prior to the casting operation have been assembled on and wound around the inner mold section. When subsequently after completion of the casting operation, the hollow body is removed from the inner mold section, there exists the danger of damaging the cast body. This danger is particularly great when the walls of the cast body are very thin.

It is, therefore, an object of the present invention to provide a mold which will overcome the above mentioned drawbacks.

It is another object of this invention to design the outer mold section in such a way that a damaging of the cast body during the removal thereof from the outer mold section will be eliminated or at least reduced to a minimum.

These and other objects and advantages of the invention will appear more clearly from the following specification in connection with the accompanying drawing, in which:

FIG. 1 is a longitudinal section through a mold according to the present invention for casting thin-walled cylindrical bodies of a castable material similar to rubber as for instance polyurethane.

FIG. 2 shows half of a top view of the mold according to FIG. 1.

The mold according to the present invention is characterized primarily in that the outer mold section, near its upper marginal portion has a circumferential groove on its inner surface which groove has a depth preferably equalling at least the width of the castable material receiving chamber of the mold, or expressed differently a depth which preferably corresponds at least to the wall thickness of the cast product.

The said groove brings about that when casting the hollow body, the said groove will fill with the castable or pourable material in such a way that after consolidation of the castable material, the cast body will have its upper marginal portion provided with an outwardly extending bead-like reinforcement which preferably, when further processing or machining the hollow body, may be removed.

In view of the said circumferential groove and the reinforcement obtained thereby of the cast body, a positive connection of the cast body with the outer mold section will be obtained at the upper marginal portion of the mold or molded body. This reinforcement permits withdrawal of the inner mold section without damage to the cast body after the cast body has solidified. Subsequently, a simple lifting out of the cast body from the outer mold section will be possible. This will be particularly the case when that portion of the outer mold section which is provided with the circumferential groove is detachably connected to the remainder of the outer mold section. If thus the inner mold section has been withdrawn and if furthermore the said detachable portion of the outer mold section is detached from the latter, the cast body can easily be grasped at the upper bead or reinforced section of the molded body and be totally withdrawn from the outer mold section.

Referring now to the drawing in detail, the mold illustrated therein comprises an outer mold section 1 and a guiding mandrel 2 arranged within and in radially spaced relation to said mold section 1. The mold furthermore comprises an inner mold section or core 3 arranged within said outer mold section 1 in radially spaced relationship therein and mounted on and supported by said mandrel 2. In this way, the outer mold section 1 together with the inner mold section 3 and a mold bottom 8 confine the mold chamber 4, said inner and outer mold sections 1 and 3 resting on conical surfaces 8' and 8" respectively, while the mandrel 2 may be connected to the bottom 8 in any convenient manner, for instance by welding. The mold chamber 4 will, of course, receive the castable material for forming the hollow cylinder to be produced.

Mounted on the upper end face of the outer mold section 1 is a ring member 6 provided with a handle 5. The outer mold section 1 has screwed into its flange 1a a bolt 9 the upper portion of which is easily detachably engaged by a cutout 10 in the ring member 6. This ring member 6 has a recess 6a in its bore 6b. This recess 6a together wih the adjacent end face of the outer mold section 1 forms a circumferential groove 7, the lower lateral surface 7' of said groove forming the separating plane between the outer mold section 1 and the ring member 6. Thus, when all of the members of the mold are in assembled condition as shown in FIG. 1 and the castable material is poured into chamber 4 in customary manner, a hollow cylindrical body will be formed which at the upper end thereof will be provided with a marginal bead or reinforcement corresponding to the shape of the circumferential groove 7. After the casting operation has been completed and the cast body has solidified, first core 3 is pulley out of the inner mold section 1. The molded body, which may have a wall thickness of, for instance 0.8 millimeter, cannot follow this withdrawal movement of core 3 because it will be prevented from so doing by the bead or flange at its upper end since ring member 6 is still in its assembled and locked position.

Thereupon, ring member 6 by means of handle 5 is rotated in corresponding direction (in counter-clockwise direction with regard to FIG. 2) and is lifted off outer mold section 1 so that the said bead or flange of the cast body will be free. The cast body will then be grasped at said bead portion and can easily be lifted out of the outer mold section 1.

The cast body which, if the inner mold section 3 and outer mold section 1 are correspondingly designed, may be profiled at its inner and/or outer surface, for instance, be provided with teeth, will then be cut into individual rings or belts at which occasion also the bead corresponding to the circumferential grooves 7 will be removed.

If desired, the cast body may also be provided with reinforcing inserts as for instance with wire strands extending in circumferential direction of the cast body. Such inserts are, of course, prior to the casting operation and prior to the insertion of the inner mold section into the outer mold section wound around said inner mold section.

The mold according to the present invention may also be employed for producing sleeves and cuffs and also such hollow bodies which have a relatively thin wall parallel to the longitudinal axis of the body. With products of this type, it is not necessary to cut the cast body into individual rings. Furthermore, with at least some of such bodies the marginal reinforcement or bead may remain on the finished product.

It is, of course, to be understood that the present invention is, by no means, limited to the particular construction shown in the drawing but also comprises any modifications within the scope of the appended claims. Thus, if desired, the single circumferential groove shown in the drawing may also be replaced by one or more recesses. When providing a plurality of recesses or depressions, it is advantageous to distribute the same over the circumference of the mold.

What I claim is:

1. A mold for casting a hollow cylindrical thin walled body which comprises: bottom wall means, outer wall means having an axial cylindrical bore and being supported by said bottom wall means, inner wall means arranged within and in radially spaced relationship to said outer wall means and supported by said bottom wall means, said inner wall means being withdrawable from said outer wall means and together with said outer wall means and said bottom wall means confining an annular chamber for receiving castable material, said outer wall means comprising a first member forming the major portion of said outer wall means and being provided with radially outwardly extending flange means, bolt means mounted in said flange means and provided with a head spaced from said flange means in a direction away from said bottom wall means, said outer wall means also comprising a second wall member detachably mounted on that end face of said first wall member which is remote from said bottom wall means, said second member being provided with slot means registering with said bolt means and having a first portion larger in diameter than the head of said bolt means, and also having a second portion narrower than the head of said bolt means whereby said second member when rotated into a first position is lockable to said first member and when rotated into a second position is detachable from said first member, said second member having cutout means confining with the adjacent end face of said first member recess means communicating with the annular chamber between said first member and said inner wall means.

2. A mold for casing a hollow cylindrical thin walled body which comprises: bottom wall means, outer wall means having an axial cylindrical bore and being supported by said bottom wall means, inner wall means arranged within and in radially spaced relationship to said outer wall means and supported by said bottom wall means, said inner wall means being withdrawable from said outer wall means in axial direction thereof and together with said outer wall means and said bottom wall means confining an annular chamber for receiving castable material, said outer wall means comprising a first wall member forming the major portion of said outer wall means and also comprising a second wall member detachably mounted on that end face of said first wall member which is remote from said bottom wall means, said second wall member having a central bore forming a part of said axial cylindrical bore of said outer wall means, that inner peripheral surface of said second wall member which confines the central bore thereof being provided with cutout means which together with said end face form recess means communicating with said annular chamber, each of said first and second wall members forming a circumferentially permanently closed annular body, and means operatively connected to said first and second wall members and operable in response to a rotation thereof relative to each other in one direction to interlock said first and second wall members and in response to a rotation of said wall members relative to each other in the opposite direction to permit removal of said second wall member from said first wall member.

3. A mold for casting a hollow cylindrical thin walled body, which comprises: bottom wall means, an upright mandrel supported by said bottom wall means, inner wall means forming a hollow cylindrical body slidably mounted on said mandrel and supported by said bottom wall means, said inner wall means being selectively withdrawable from said mandrel, outer wall means having an axial cylindrical bore substantially coaxial with said mandrel and being supported by said bottom wall means, said outer wall means being arranged in radially spaced relationship to said inner wall means so as to confine therewith an annular chamber for receiving castable material, said outer wall means comprising a first member forming the major portion of said outer wall means and also comprising a second member detachably mounted on that end face of said first member which is remote from said bottom wall means, said second member having a central bore forming a part of said axial cylindrical bore of said outer wall means, that inner peripheral surface of said second member which confines the central bore thereof being provided with cutout means which together with said end face form recess means communicating with said annular chamber, each of said first and second members forming a circumferentially permanently closed annular body, and means operatively connected to said first and second members and operable in response to rotation thereof relative to each other in one direction to interlock said first and second members and in response to rotation of said members relative to each other in the other direction to permit removal of said second member from said first member.

References Cited by the Examiner

UNITED STATES PATENTS 2,219,576   10/40   Moreland _____ 18—42 XR
2,331,000   10/42   Schaefer _____ 25—126
2,823,439   2/58    Schnidgalt.

WILLIAM J. STEPHENSON, *Primary Examiner.*